United States Patent
Hudgens et al.

(10) Patent No.: US 6,634,189 B1
(45) Date of Patent: Oct. 21, 2003

(54) GLASS REACTION VIA LIQUID ENCAPSULATION

(75) Inventors: James Jay Hudgens, Plano, TX (US); John Michael Trombetta, Plano, TX (US); William David Autery, Richardson, TX (US); Gregory Stewart Tyber, Richardson, TX (US)

(73) Assignee: Raytheon Company, Lexington, MA (US)

( * ) Notice: Subject to any disclaimer, the term of this patent is extended or adjusted under 35 U.S.C. 154(b) by 204 days.

(21) Appl. No.: 09/686,536

(22) Filed: Oct. 11, 2000

(51) Int. Cl.[7] ................................................. C03C 3/32
(52) U.S. Cl. ..................... 65/389; 65/347; 65/DIG. 11; 65/DIG. 15; 501/40
(58) Field of Search .................. 65/347, 389, DIG. 11, 65/DIG. 15; 501/40

(56) References Cited

U.S. PATENT DOCUMENTS

| | | | |
|---|---|---|---|
| 3,291,585 A | * 12/1966 | Okamura | |
| 3,338,728 A | 8/1967 | Hilton, Jr. et al. | 106/47 |
| 3,343,972 A | 9/1967 | Hilton, Jr. et al. | 106/47 |
| 3,360,649 A | 12/1967 | Brau et al. | 250/83 |
| 3,628,932 A | * 12/1971 | Inoue | |
| 4,484,945 A | 11/1984 | Badesha et al. | 756/0.5 |
| 4,492,763 A | 1/1985 | Trotta et al. | 501/40 |
| 4,542,108 A | 9/1985 | Susman et al. | |
| 5,385,593 A | * 1/1995 | Longobardo | |

FOREIGN PATENT DOCUMENTS

| | | |
|---|---|---|
| DE | 296 427 A5 | 12/1991 |
| EP | 0 564 190 A1 | 10/1993 |

* cited by examiner

Primary Examiner—Michael Colaianni
(74) Attorney, Agent, or Firm—Baker Botts L.L.P.

(57) ABSTRACT

A method of making chalcogenide glass which utilizes liquid encapsulation to prevent the evaporation loss of low boiling point or high vapor pressure glass components while the glass melt is being processed.

35 Claims, 2 Drawing Sheets

GLASS REACTION VIA LIQUID ENCAPSULATION

Portions of this invention were made with support of the United States Government under agreement number DAAB07-98-3-J002 awarded by the U.S. Army Communication and Electronics Agency and administered by the Night Vision Electronic Sensors Directorate (NVESD). The Government may have certain rights to the invention under this agreement.

BACKGROUND OF THE INVENTION

1. Field of the Invention

The present invention relates to a method of making chalcogenide glasses. More particularly, the invention relates to a method of making selenium based chalcogenide glasses utilizing liquid encapsulation.

2. Description of the Related Art

Chalcogenide glasses consists of one or more of the elements sulfur (S), selenium (Se), or tellurium (Te). Chalcohalides are glasses containing one or more of the elements S, Se and Te, and one or more halides anions (F, Cl, Br and I). Chalco-oxides are glasses containing one or more of the elements S, Se and Te and oxygen. Chalcogenide glasses are of interest because of their ability to transmit infrared radiation. Selenium based chalcogenide glasses (for example, $As_2Se_3$ and $Ge_{28}Sb_2Se_{60}$) are of particular interest due to their chemical durability, moderate glass transition temperatures, and ability to transmit infrared radiation both in the 3–5 $\mu$m and 8–12 $\mu$m regions.

Chalcogenide glasses have been made by a number of techniques. U.S. Pat. Nos. 3,338,728, 3,343,972, and 3,360,649 disclose the production of chalcogenide glasses in sealed ampoules similar to that discussed below in relation to the commercial chalcogenide glass known as TI-1 173. U.S. Pat. No. 3,360,649 relates specifically to a selenium-germanium-antimony chalcogenide glass.

U.S. Pat. No. 4,484,945 discloses a process which involves subjecting a mixture of chalcogenide oxides contained in solution to a simultaneous coreduction reaction. The coreduction reaction is achieved by adding reducing agents to the oxide solution such as hydrazine, sulphur dioxide, thioureas, etc.

U.S. Pat. No. 4,492,763 discloses germanium-free chalcogenide glasses prepared utilizing sealed ampoules.

High purity oxide glasses may be prepared by melting the oxides together in an open crucible. For selenium based chalcogenide glasses, high purity metal selenides are generally not commercially available, therefore, selenium metal is melted and reacted to form chalcogenide glass. Selenium melts at 216° C. and its vapor pressure reaches I atmosphere at 685° C. while the melting points of most other chalcogenide glass components are greater than 700° C. Therefore, reaction in an open crucible will result in the almost complete evaporation loss of selenium.

One selenium based chalcogenide glass was formerly made by Texas Instruments, now Raytheon Company, and is known as TI-1 173. TI-1 173 is a ternary glass composition made according to the formula $Ge_{28}Sb_{12}Se_{60}$. To prevent the evaporation loss of selenium during the making of TI-1173, the reaction is conducted in a sealed quartz ampoule. The starting materials including selenium metal are placed in a quartz tube and the tube is sealed while under a vacuum. The tube is slowly heated and mixing of the molten metals occurs by rocking and/or rolling the tube during heating. The tube is then quenched to form the chalcogenide glass. The quartz tube is sacrificed to remove the reacted glass. While this method allows for commercial production of TI-1173, there are a number of shortcomings with this method, including: (1) during sealing of the quartz tube, oxygen, an impurity, may be introduced, degrading IR transmission; (2) there is a risk of explosion of the sealed quartz tube during heating if the ampoule is not designed and/or heated properly to prevent sublimation of the selenium melt; (3) the rock and/or roll mixing is not sufficient to produce optical quality glass; the reacted glass must be re-melted, stirred, re-cast and annealed to produce optical quality glass; (4) the quartz ampoule is not reusable, (5) temperatures in excess of 900° C. must be reached to completely melt the germanium; and (6) glass batch size is limited by the size of commercially available quartz tubing, and by the margin of safety required to reduce the risk of explosion.

SUMMARY OF THE INVENTION

Accordingly, a need has arisen for making chalcogenide glass, and particularly selenium based chalcogenide glass, in a safer and more economical fashion.

In accordance with the present invention, a method of producing chalcogenide glass is provided that significantly improves the safety and economy of making the glass. The method includes the steps of: (1) placing about stoichiometric amounts of glass components into a reactor, (2) substantially covering the glass components in the reactor with an encapsulent to prevent the evaporation loss of low boiling point or high vapor pressure glass components, and (3) heating the glass components to a temperature below the boiling points of the components, and (4) actively mixing the components to cause the liquid glass components to react with the solid glass components to form molten chalcogenide glass.

Accordingly, an object of the present invention is to provide an improved method for producing selenium based chalcogenide glasses which is safer and more economical than known methods.

BRIEF DESCRIPTION OF THE DRAWINGS

A better understanding of the invention can be obtained when the detailed description of exemplary embodiments set forth below is considered in conjunction with the attached drawing in which.

DETAILED DESCRIPTION OF THE EMBODIMENTS

Figure 1:
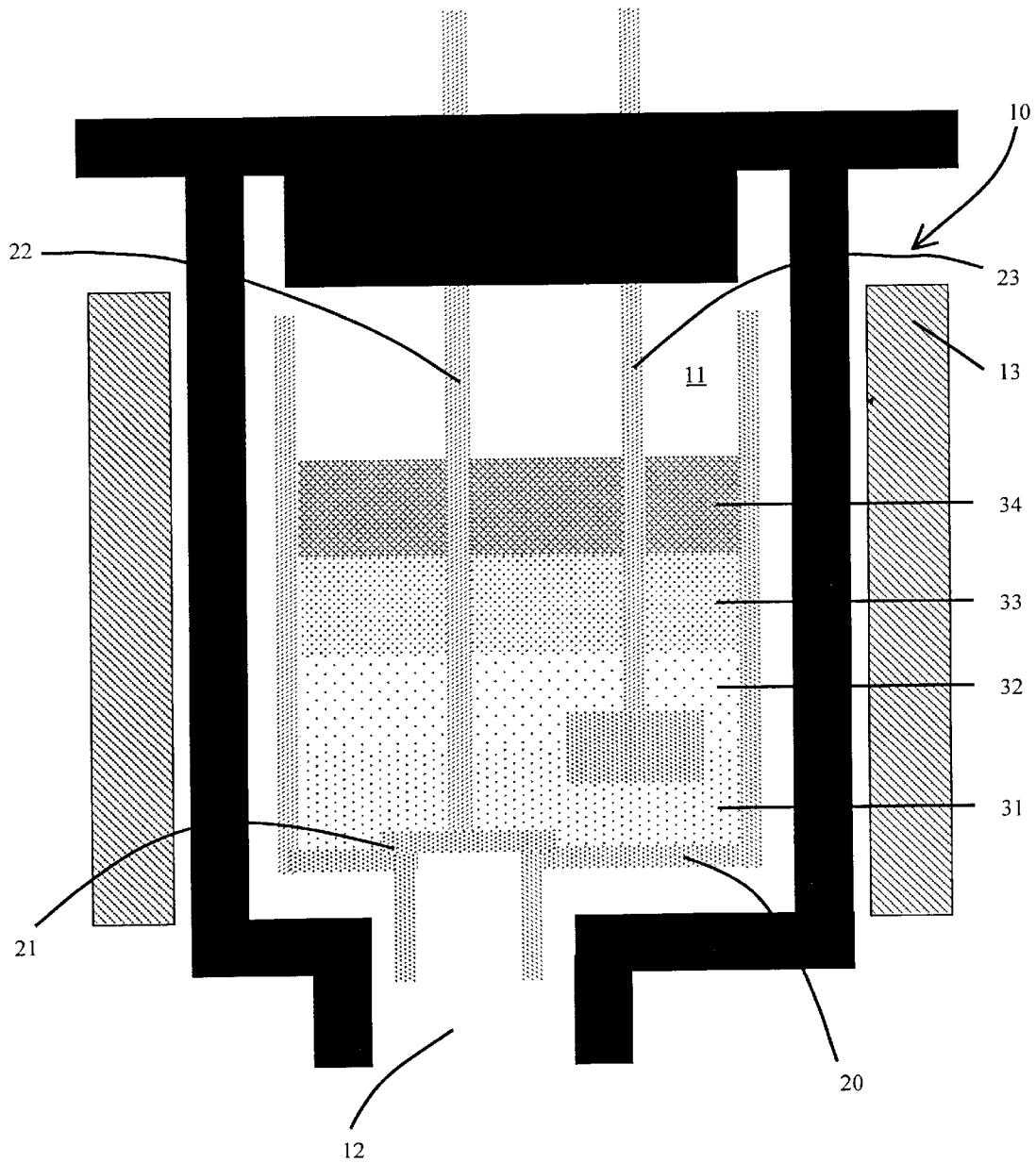
FIG. 1 is a simplified cross-sectional drawing of a reaction chamber for carrying out the present inventive method.

With reference to FIG. 1, the process of the present invention is preferably carried out in a reactor 10 having an internal reaction chamber 11. The reactor 10 is at least partially surrounded by a heater 13. Within the reactor 10, is a melt crucible 20 having a melt valve 21 (with a melt valve handle 22) and a stir bar 23. The reactor 10 has a snoot 12 for removing the molten chalcogenide glass.

As shown in FIG. 1, there are three levels indicating ternary glass components and a fourth level indicating an encapsulent. Preferably, for ternary glass, the three ternary glass components are levels 31, 32, and 33 and the encapsulent is level 34. As discussed in more detail below, before heating begins, preferably, level 31 is selenium, level 32 is antimony, level 33 is germanium, and level 34 is $B_2O_3$.

It has been found that if glass crucibles, stir bars and melt valves are used, the $B_2O_3$ wets the glass and then breaks the glass upon cooling due to the large differential in thermal expansions. Therefore, it is preferred to utilize vitreous carbon crucibles, stir bars and melt valves such that the $B_2O_3$ does not wet these items and that they can be reused.

|  | Melting Point (° C.) | Boiling Point (° C.) |
|---|---|---|
| Selenium (Se) | 216 | 685 |
| Antimony (Sb) | 630 | 1750 |
| Germanium (Ge) | 937 | 2830 |
| Boron Oxide ($B_2O_3$) | 450 | 1860 |

As can be seen from the above table, selenium has a melting point of 216° C. Many chalcogenide glass components have melting points greater than 700° C. Even at antimony's relatively low melting point of 631° C., if antimony were to be melted in the presence of selenium under atmospheric conditions, e.g., an open crucible, a significant loss of selenium would result from evaporation.

While the preferred chalcogenide glass is TI-1173 ($Ge_{28}Sb_{12}Se_{60}$), the present invention may be used to make any chalcogenide glass, and is particularly adapted for making chalcogenide glasses where one or more components have a low boiling point (high vapor pressure) in relation to one or more other components which have a high melting point.

The present invention applies to chalcogenide glasses in its broadest definition, including chalcohalides, chalcooxides, as well as the combination of chalcogenide elements (S, Se, Te) with Group VA elements (including phosphorus (P), arsenic (As), antimony (Sb) and bismuth (Bi)), the combination of chalcogenide elements with Group IVA elements (including germanium (Ge), tin (Sn) and lead (Pb)), and the combination of chalcogenide elements with Group IIIA elements (including aluminum (Al), gallium (Ga), indium (In) and thallium (Tl)).

For purposes of the present application, boron oxide ($B_2O_3$), is an "encapsulent". An encapsulent is any element or compound which meets the following requirements:

(1) is a liquid (molten) at temperatures suitable to form chalcogenide glasses;

(2) is a liquid (molten) below the boiling point of the lowest boiling point component of the melt being processed;

(3) has a density lower than that of the melt being processed; and (4) does not contaminate the melt being processed.

The encapsulent, preferable boron oxide ($B_2O_3$), covers the melt being processed and prevents the evaporation of low boiling point components. For the particular case of $B_2O_3$, it is a solid when placed in the reactor at room temperature and melts (450° C.) as the components of the chalcogenide glass melt are being heated. For the case of $B_2O_3$, it melts at 450° C., well before the boiling point of selenium (685° C.), such that it prevents any significant selenium evaporation.

Other compounds suitable for the encapsulent include multicomponent borate, silicate and phosphate glasses and multicomponent mixed glasses such as borosilicates, borophosphates and phosphosilicates.

In addition to preventing the evaporation of low boiling point components, the encapsulent allows for stirring the melt, allows for easy operation of the melt valve 21 (utilizing melt valve handle 22), and allows thermocouples (not shown) to be inserted to determine temperature at various depths of the melt.

The encapsulent has a lower density than that of the melt being processed. This allows the encapsulent to remain on the top of the melt being processed to prevent evaporation loss, but also provides for reducing contaminants in the glass, and, upon operation of the melt valve 21, allows the molten chalcogenide glass to be removed through the snoot 12 with the encapsulent remaining in the crucible 20.

The following description details the preferred method of making TI-1173 according to the present inventive method:

1. Starting Materials

Stoichiometric amounts (as noted below) germanium, antimony, and selenium, each 99.999% pure, are obtained from a suitable source. One such suitable source is Sigma-Aldrich Corp. of St. Louis, MO.

Germanium 28 mol %.

Antimony 12 mol %.

Selenium 60 mol %.

The $B_2O_3$ may be purchased as glass pucks containing <200 ppm $H_2O$ from GFI Advanced Technologies of Teaneck, N.J.

2. Process

Germanium and antimony ingots are broken into pieces, preferably <3 cm in diameter. The selenium, antimony and germanium are layered in the crucible 20, with, preferably, selenium as the lower level 31, followed by antimony (level 32), then followed by germanium (level 33). $B_2O_3$ sufficient to form an about one inch level (level 34) is added on top of the germanium. Preferably, the selenium is on the lower level 31 as it melts first and has a high vapor pressure (low boiling point); thus, as the selenium melts, the antimony (the second lowest melting point component) falls into the molten selenium, improving the glass formation reaction and heat transfer. Also, with the selenium on the lower level 31, there is less opportunity for the selenium to evaporate before the $B_2O_3$ layer (level 34) melts.

A vacuum bake-out is performed on the crucible 20 and its contents to remove residual moisture and oxygen. This is done by heating the reactor 10 and its contents to 200° C. under a vacuum of <200 milliTorr for one hour. This vacuum bake-out helps to prevent moisture and oxygen from contaminating the chalcogenide glass (which is very sensitive to impurities). Following this, the reactor 10 is pressured with dry nitrogen to a pressure of about 1psig while maintaining a purge rate of about 4 scfh. The reactor 10 atmosphere is checked to verify that the $O_2$ and $H_2O$ contents are each below 20 ppm. Crucible 20 is then heated to 450° C. and held at that temperature for 60 minutes. At 217° C., the selenium melts and begins dissolving the solid antimony and germanium. At 450° C., the $B_2O_3$ melts and encapsulates the germanium, antimony and liquid selenium. The crucible 20 and its contents are then heated to 630° C. At 630° C., the antimony melts and starts reacting with the solid germanium. With both the selenium and antimony molten, vigorous mixing is provided to dissolve the solid germanium chunks. The stirring speed is ramped from 1 rpm to 60 rpm by increasing the speed at 1 rpm/min. and the temperature is raised to 670° C. The temperature is held at 670° C. with the contents being mixed at 60 rpm for 120 minutes. Under these conditions, the solid germanium will completely dissolve in the selenium/antimony melt and a glass forming melt will be produced. Preferably, the temperature should not be raised above 670° C., because the boiling point of selenium is 680° C. Following these procedures, a glass forming melt has been produced, however, refining of the glass must be completed to produce optical quality glass.

To "fine" (to remove bubbles from) the melt, the stirring is stopped and the melt cooled to 640° C. for 60 minutes, and any bubbles in the melt will rise to the top of the melt. After fining, the melt is readied for lens casting by lowering the melt temperature to 560° C. and stirring at 35 rpm for 60 minutes. This homogenizes the chemical composition of the melt. The stirring is stopped just before the glass is cast into the plate mold. This is accomplished by raising the melt valve 21 such that the melt flows out the snoot 12 into the plate mold.

After the lens casting is complete, any remaining glass melt and $B_2O_3$ in the crucible 20 are dumped and the crucible 20, stir bar 23, and melt valve 21 are removed and cleaned.

EXAMPLE

| Starting Materials | grams |
|---|---|
| Selenium | 691 |
| Antimony | 213 |
| Germanium | 296 |
| $B_2O_3$ | 600 |

| Time (Min.) | Procedure and Comments |
|---|---|
| — | Vacuum on overnight-pulled to 300 m Torr. |
| 1 | Vacuum at 225 m Torr; vacuum off; low purge at 4 scfh; set melt set-point controller to 450° C. |
| 78 | Melt themocouple reading 440° C.; set melt set-point controller to 535° C. |
| 85 | Set melt set-point to 560° C. |
| 110 | Increase heating. |
| 161 | 15 rpm; melt is 652.6° C. |
| 172 | 20 rpm; melt is 653.5° C. |
| 177 | 25 rpm; melt is 654.7° C. |
| 183 | 30 rpm; melt is 658.8° C. |
| 189 | 35 rpm; melt is 662.4° C. |
| 387 | Start to homogenize; lower melt set-point to 490° C.; lower stir to 20 rpm for 40 min, then stop. |
| 513 | Lower melt set-point to 470° C. |
| 557 | Lower melt set-point to 465° C. |
| 573 | Pour into plate mold. |

1193 g of raw (unfinished) T-1173 glass was produced in the experiment.

Figure 2:
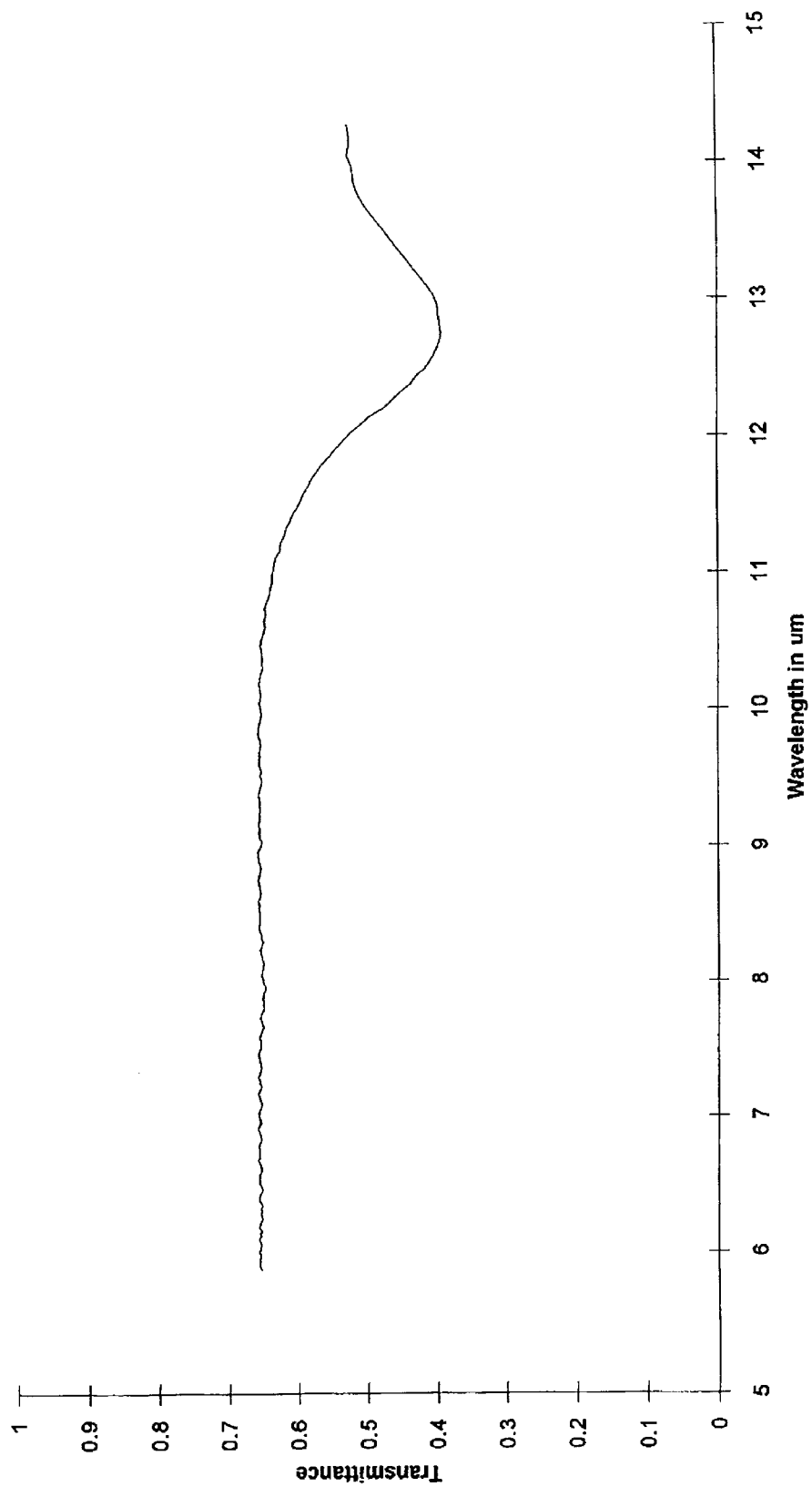
FIG. 2 is a graph of Transmittance vs. Wavelength for chalcogenide glass made pursuant to the example herein.

A 0.3955 in. thick glass casting was produced. This glass casting was tested for IR transmittance yielding the results shown in FIG. 2 and the following results:

At 12.8 µm A=0.508 cm$^{-1}$

At 12.5 µm A=0.455 cm$^{-1}$

At 12.0 µm A=0.226 cm$^{-1}$

At 10.0 µm A=0.021 cm$^{-1}$

At 8.3 µm A=0.023 cm$^{-1}$

At 8.0 µm A=0.026 cm$^{-1}$

At 7.5 µm A=0.019 cm$^{-1}$

Where A is Absorbance.

7.5 to 11.5 µm

Avg. Transmittance=65.0%

11.5 to 13.5 µm

Avg. Transmittance=47.7%

7.5 to 13.5 µm

Avg. Transmittance=61.2%

The present inventive method of making chalcogenide glass is advantageous over known methods of making chalcogenide glass. The present inventive method is easier, more economical and safer than previously known methods. The present inventive method solves the several problems noted above relating to making chalcogenide glass in sealed ampoules, specifically (1) No sealing of a quartz tube is required, and oxygen contamination is minimized; (2) There is no risk of explosion because the selenium temperature may be tightly controlled, and any rapid over-pressure of reaction chamber 11 may be relieved by over-pressure valves (not shown); (3) Because the reaction takes place in crucible 20, the glass components can be stirred sufficiently to produce optical quality glass, and the glass can be poured (snoot 12) directly from crucible 20 to cast desired shapes; (4) The crucible 20 is reusable whereas the quartz tube is not; (5) The reaction takes place several hundred degrees lower than the known sealed ampoule technique, thus requiring less sophisticated equipment; and (6) The batch size can be increased over the known sealed ampoule technique.

Having described the invention above, various modifications of the techniques, procedures, material, and equipment will be apparent to those skilled in the art. It is intended that all such variations within the scope and spirit of the invention be included within the scope of the appended claims.

What is claimed is:

1. A method of making chalcogenide glass, comprising the steps of:
    (a) placing about stoichiometric amounts of glass components into a reactor;
    (b) substantially covering the glass components in the reactor with an encapsulent; and
    (c) heating to a temperature sufficient to cause the glass components to react to form molten chalcogenide glass, wherein the encapsulent is not present in the chalcogenide glass.

2. The method of claim 1, wherein:
    the glass components comprise at least a first glass component and a second glass component, wherein the first glass component has a melting point which is lower than the melting point of the second glass component; and
    when heating in step (c), the encapsulent substantially prevents the evaporation loss of at least the first glass component.

3. The method of claim 2, wherein the first glass component is selenium.

4. The method of claim 2, wherein the encapsulent is $B_2O_3$.

5. The method of claim 2, wherein the encapsulent has a melting point which is lower than the boiling point of the first glass component.

6. The method of claim 1, wherein the encapsulent has a density lower than that of a combination of the glass components.

7. The method of claim 1, wherein:
    the glass components comprise at least a first glass component, a second glass component, and a third glass component,
    the heating in step (c) melts the first glass component and the second glass component, and
    the encapsulent substantially prevents the evaporation loss of at least one of the first glass component and the second glass component.

8. The method of claim 7,
    wherein, upon heating in step (c), the third glass component is a solid, and
    further comprising the step of mixing the third glass component with a combination of the first glass component and the second glass component to cause the glass components to react to form molten chalcogenide glass.

9. The method of claim 1, wherein the glass components are selected from the elements consisting of sulfur, selenium, tellurium, fluorine, chlorine, bromine, iodine, oxygen, phosphorus, arsenic, antimony, bismuth, germanium, tin, lead, aluminum, gallium, indium, and thallium.

10. The method of claim 1, wherein the glass components include at least selenium, germanium and antimony.

11. The method of claim 1,
wherein:
in the heating step (c), the glass components are heated to a temperature below the boiling point of the lowest boiling point glass component; and
in the heating step (c), at least one glass component is a liquid and at least one glass component is a solid, and
further comprising the step of mixing the glass components to cause the at least one liquid glass component to react with the at least one solid glass component to form molten chalcogenide glass.

12. A method of making chalcogenide glass, comprising the steps of:
(a) placing about stoichiometric amounts of glass components, including at least a first glass component, into a reactor;
(b) substantially covering the glass components in the reactor with an encapsulent; and
(c) heating to a temperature below the boiling point of the lowest boiling point glass component,
wherein the encapsulent is not present in the chalcogenide glass.

13. The method of claim 12, wherein, when heating in step (c), the encapsulent substantially prevents the evaporation loss of at least the first glass component.

14. The method of claim 12, wherein the first glass component is selenium.

15. The method of claim 12, wherein the encapsulent is $B_2O_3$.

16. The method of claim 12, wherein the encapsulent has a melting point which is lower than the boiling point of the lowest boiling point glass component.

17. The method of claim 12, wherein the encapsulent has a density lower than that of a combination of the glass components.

18. The method of claim 12,
further comprising a second glass component and a third glass component and, wherein:
the heating in step (c) melts the first glass component and the second glass component, and
the encapsulent substantially prevents the evaporation loss of at least one of the first glass component and the second glass component.

19. The method of claim 18,
wherein, upon heating in step (c), the third glass component is a solid; and
further comprising the step of mixing the third glass component with a combination of the first glass component and the second glass component to cause the glass components to react to form molten chalcogenide glass.

20. The method of claim 12, wherein the glass components are selected from the elements consisting of sulfur, selenium, tellurium, fluorine, chlorine, bromine, iodine, oxygen, phosphorus, arsenic, antimony, bismuth, germanium, tin, lead, aluminum, gallium, indium, and thallium.

21. The method of claim 12, wherein the glass components include at least selenium, germanium and antimony.

22. A method of making chalcogenide glass containing selenium, comprising the steps of:
(a) placing about stoichiometric amounts of glass components, including selenium and at least a second glass component, into a reactor, wherein the second glass component has a melting point of at least about 600° C.;
(b) substantially covering the glass components in the reactor with an encapsulent; and
(c) heating to a temperature sufficient to cause the glass components to react to form molten chalcogenide glass,
wherein the encapsulent is not present in the chalcogenide glass.

23. The method of claim 22, wherein the encapsulent is $B_2O_3$.

24. The method of claim 22, wherein the encapsulent has a melting point which is lower than the boiling point of the selenium.

25. The method of claim 22, wherein the encapsulent has a density lower than that of a combination of the glass components.

26. The method of claim 22,
further comprising a third glass component and,
wherein:
the heating in step (c) melts the selenium and the second glass component; and
the encapsulent substantially prevents the evaporation loss of at least one of the selenium and the second glass component.

27. The method of claim 26,
wherein, upon heating in step (c), the third glass component is a solid; and
further comprising the step of mixing the third glass component with a combination of the selenium and the second glass component to cause the glass components to react to form molten chalcogenide glass.

28. The method of claim 22, wherein the glass components are selected from the elements consisting of sulfur, tellurium, fluorine, chlorine, bromine, iodine, oxygen, phosphorus, arsenic, antimony, bismuth, germanium, tin, lead, aluminum, gallium, indium, and thallium.

29. The method of claim 22, wherein the glass components include at least germanium and antimony.

30. A method of making a ternary selenium-germanium-antimony chalcogenide glass, comprising the steps of:
(a) placing about 50 mol % to about 98 mol % selenium, about 1 mol % to about 40 mol % germanium and about 1 mol % to about 30 mol % antimony into a reactor;
(b) substantially covering the selenium, germanium and antimony in the reactor with an encapsulent; and
(c) heating the reactor to at least about 650° C. to cause the selenium, germanium and antimony to react to form molten chalcogenide glass,
wherein the encapsulent is not present in the chalcogenide glass.

31. The method of claim 30, wherein the encapsulent is $B_2O_3$.

32. The method of claim 30, wherein the encapsulent has a melting point which is lower than the boiling point of the selenium.

33. The method of claim 30, wherein the encapsulent has a density lower than that of a combination of the selenium, germanium, and antimony.

34. The method of claim 30, wherein the encapsulent substantially prevents the evaporation loss of the selenium.

35. The method of claim 30,
wherein, upon heating in step (C), the germanium remains a solid, and
further comprising the step of mixing the solid germanium with a combination of the selenium and antimony to cause the selenium, antimony and germanium to react to form molten chalcogenide glass.

* * * * *

UNITED STATES PATENT AND TRADEMARK OFFICE
CERTIFICATE OF CORRECTION

PATENT NO.   : 6,634,189 B1
DATED        : October 21, 2003
INVENTOR(S)  : James Jay Hudgens et al.

It is certified that error appears in the above-identified patent and that said Letters Patent is hereby corrected as shown below:

Column 1,
Line 28, change "$Ge_{28}Sb_2Se_{60})$" to -- $Ge_{28}Sb_{12}Se_{60})$ --;
Line 36, change "TI-1 173" to -- TI-1173 --; and
Line 60, change "TI-1 173" to -- TI-1173 --, both occurrences.

Column 3,
Line 38, "thallium (TI))." should be -- thallium (TI)). --

Column 4,
Line 23, "Gernanium" should be -- Germanium --; and
Line 63, "produced, however," should be -- produced; however, --.

Column 5,
Line 36, change "for 40 min, then stop." to -- for 40 min. then stop. --; and
Line 40, change "(unfinished) T-1173 glass" to -- (unfinished) TI-1173 glass --.

Column 6,
Line 50, change "component," to -- component; --;
Line 52, change "component, and" to -- component; and --; and
Line 58, change "solid, and" to -- solid; and --.

Column 7,
Line 9, change "solid," to -- solid; --; and
Line 43, change "component, and" to -- component; and --.

UNITED STATES PATENT AND TRADEMARK OFFICE
CERTIFICATE OF CORRECTION

PATENT NO. : 6,634,189 B1
DATED : October 21, 2003
INVENTOR(S) : James Jay Hudgens et al.

It is certified that error appears in the above-identified patent and that said Letters Patent is hereby corrected as shown below:

<u>Column 8,</u>
Line 61, change "step (C)" to -- step (c) --; and
Line 62, change "solid, and" to -- solid; and --.

Signed and Sealed this

Twenty-eighth Day of September, 2004

JON W. DUDAS
*Director of the United States Patent and Trademark Office*